United States Patent Office 3,100,758
Patented Aug. 13, 1963

3,100,758
VINYL HALIDE COPOLYMERS WITH OXIRANE-CONTAINING SIDE GROUPS HAVING IMPROVED HEAT STABILITY
Abraham Ravve, Chicago, and Joseph T. Khamis, Brookfield, Ill., assignors to Continental Can Company, Inc., New York, N.Y., a corporation of New York
No Drawing. Filed Dec. 31, 1959, Ser. No. 863,099
16 Claims. (Cl. 260—45.5)

This invention relates to the preparation of vinyl halide compounds having grafted side groups with oxirane rings.

It is well known that vinyl halide resins form strong, tough, impermeable films. They have the defects in that solubility is low, and during a baking in contact with metal, degeneration can occur; and that they have low adhesion to metal surfaces. Accordingly, components such as metal organic salts have been admixed as hydrochloric acid acceptors during the baking, and conjoint polymers of vinyl halide and other components have been made, such as the copolymers of vinyl chloride and vinyl acetate, the tripolymers of vinyl chloride with vinyl acetate and maleic compounds, and of other vinyl compounds with vinyl chloride. Mixtures of vinyl chloride polymers and vinyl acetate polymers may be prepared, e.g., as so-called interpolymers, and mixtures of vinyl chloride polymers with epoxy and other resins. Further, vinyl halide enamels have been employed over base coats of oleoresinous enamels, as well as others, to attain the effects of the strong adhesion to metal and the barrier effect of such primer coatings; and mixtures of vinyl halide resins with oleoresins have been conjointly applied and cured. Likewise, vinyl halide polymers have been modified, as by the introduction of ethylene groups in the so-called telomerization. A disadvantage of employing a hydrochloric acid scavenger or acceptor, with the polymer, is that such compounds migrate easily and do not act solely at the metal interface and they can be leached from the baked coatings to the detriment of the contents of a container having an internal enamel including the same. Further, the presence and action of such components at the metal interface frequently, particularly in the case of epoxidized drying oils, further reduces the inherently poor adhesion of the polyvinyl chloride to the metal. In other cases, for example, when a metal salt is employed, it is detrimental to flexibility of the coated article.

According to this invention, a grafting is performed upon vinyl halide polymer, e.g., vinyl chloride homopolymer, vinyl chloride-vinyl acetate copolymer, vinyl chloride-vinylidene chloride copolymer, with the establishment upon the backbone of such molecules of side groups having epoxy radicals also known as oxirane groups. Such side groups have the combined effects of producing strong bonds to metal such as black plate or tin plate, and of stabilizing the molecule against degeneration during curing.

This effect can be attained by the reaction of vinyl halide polymer and a bifunctional epoxy vinyl compound with the aid of a free-radical polymerization agent.

The illustrative butadiene monoxide is an organic compound containing an epoxy group and a vinyl group, with the structure:

(1)  H₂C=CH—CH——CH₂ (with epoxy O)

The illustrative glycidyl methacrylate also has an epoxy group and a vinyl group, with the structure:

(2) 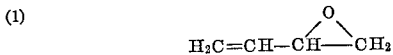

Other usable organic compounds containing an epoxy group and a vinyl group, for the formation of side linkages upon the vinyl halide polymer backbone, are Glycidyl acrylate (3) 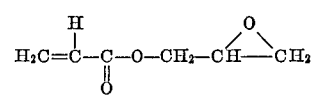

Dipentene monoxide (4) 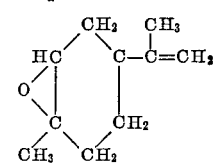

Glycidyl vinyl ether (5) 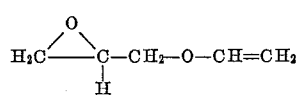

The illustrative benzoyl peroxide can be replaced by other free radical initiating reagents, including methyl ethyl ketone peroxide, cumene hydroperoxide, acetyl peroxide and azobisisobutyronitrile.

The reaction of grafting appears to have started significantly, with benzoyl peroxide, methyl ethyl ketone peroxide or azobisisobutyronitrile as free radical initiator, with two hours of heating at 60 degrees C., but is incomplete and coatings prepared from the resulting graft copolymers lack the full qualities sought by this invention. Comparably, for example, heating at 100 degrees C. for two hours using benzoyl peroxide as the initiator gives a product which exhibits the desirable physical properties such as heat resistance and good adhesion in an enamel upon baking at 350 degrees F. for 14 minutes. There appears an inverse time:temperature relationship; so that excellent results are obtained with benzoyl peroxide initiation by heating at 80 degrees C., for four hours. Other free radical initiators likewise exhibit the inverse time:temperature relationships, for example, a higher-energy initiator such as acetyl peroxide is effective upon heating at 60 degrees C. for four hours. In general, with the recognized free-radical initiators, desirable coatings can be produced by baking the product which has been prepared at temperatures of 60 to 100 degrees C. for inverse times of eight to two hours.

The mechanism of the reaction appears to be that the catalyst of the examples generates free radicals upon heating to 60 to 100 degrees C.:

(I) 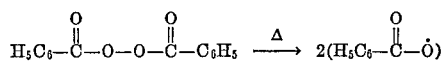

or, (II) 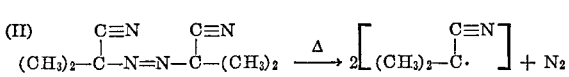

These free radicals attack any double bond present, on the vinyl polymer (noting the terminal unsaturation groups) or on the epoxy-vinyl compound, and create new free radicals (denoted by Ċ in the structures) which result in a chain growth (propagation):

(III) 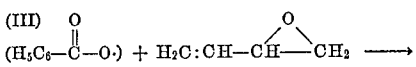 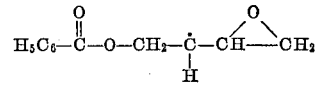

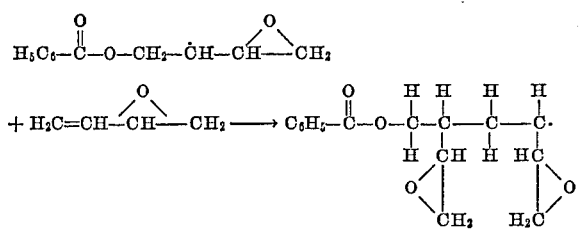

or, a free radical may abstract a proton from the vinyl chloride polymer backbone chain, thereby terminating itself and creating a new free radical site on the backbone (chain transfer):

(IV)
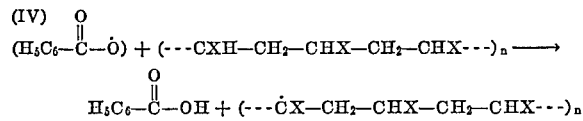

where X denotes a chlorine atom, an acetate group or other existing side radical satisfying the carbon atom of the polymer, and $n$ indicates the presence of a long chain backbone, or, by the abstraction of a chlorine atom from the vinyl chloride unit of the polymer and subsequent entry of the epoxy containing monomer unit (chain transfer):

(V)
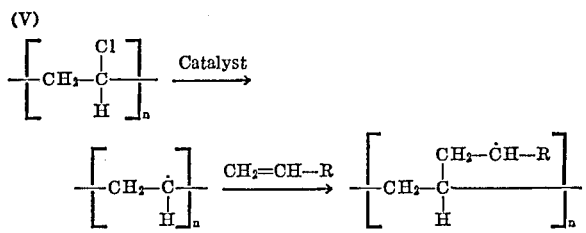

A general method of preparation of the graft copolymers of this invention is to dissolve a vinyl or vinylidene chloride polymer in a suitable solvent and mix in a reaction kettle having a mechanical stirrer and a reflux condenser, with 0.1 to 5 percent by weight of free radical catalyst and 10 to 30 percent by weight (based on the polymer) of the bifunctional component. An inert nonoxidizing atmosphere such as nitrogen is introduced. The reaction mixture is heated at 60 to 80 degrees C. for six to four hours while stirring. The product is cooled, precipitated, and preferably washed and dried, and is a white polymer substance ready for dissolution in a suitable solvent and use as an organic enamel coating composition.

EXAMPLE 1

29.6 pounds of vinyl chloride:vinyl acetate copolymer (87 percent vinyl chloride, 13 percent vinyl acetate, the material available commercially under the trademark VYHH being used) are combined in a reaction kettle with 2.96 pounds of glycidyl methacrylate monomer (free of inhibitor), 0.10 pound of benzoyl peroxide, and 59.0 pounds of anhydrous methyl ethyl ketone. The mixture is stirred and heated to 80 degrees C., with a nitrogen atmosphere, for four hours. The modified polymer is then precipitated with isopropyl alcohol, separated, washed with isopropyl alcohol, and dried.

EXAMPLE 2

150 grams of the copolymer of Example 7 are combined in a reaction flask with 400 milliliters of dry acetone, 15 grams of dipentene monoxide, 0.25 gram of acetyl peroxide, and 0.1 gram of ascorbic acid. The mixture was stirred, while heating to refluxing of solvent for eight hours, with a nitrogen atmosphere. The modified polymer was precipitated with isopropyl alcohol, washed and dried as in Example 1.

EXAMPLE 3

150 grams of vinylidene chloride:vinyl chloride copolymer (15:85 ratio) are dissolved in 400 milliliters of dry toluene, and combined in a resin kettle with 30 grams of glycidyl methacrylate, 1.8 grams of benzoyl peroxide. The mixture was stirred and heated, with a nitrogen atmosphere, for four hours at 80 degrees C. The modified polymer was precipitated with isopropyl alcohol, washed and dried as before.

The products of these examples were employed by dissolving, at 15 percent solids, in appropriate solvents such as ketones, aromatic hydrocarbons, or mixtures thereof, to yield solutions having viscosities of about 52 cps. The solutions are applied, e.g., by spraying or roller-coating on metal surfaces; during the work sheet steel with an electrolytic tin plating of 0.25 pound of tin per 218 square feet of metal surface was employed. The coated sheets were heated in an oven for three minutes to 15 minutes at 360 degrees F. Other specimens were baked at other ranges, as high as 415 degrees F. for twenty minutes. The products were then observed as to appearance of enamel, flexibility and adhesion.

It is preferred that at least fifty percent of the bifunctional component has become bonded to the backbone directly or by polymerization.

The procedure can be described as a polymerization of the bifunctional branch-forming component by the aid of a free radical catalyst, in the presence of a preformed backbone polymer, wherewith bonding to that backbone polymer occurs and a graft copolymer is formed.

These reactions are carried out in solution, with the solvent selected for its ability to fully swell and disperse the backbone polymer, dissolve the bifunctional component, and have sufficiently low chain transferring activity to facilitate the growth of long branches.

Such solvents include the ketones such as acetone, methyl ethyl ketone, isophorone and the other known vinyl chloride polymer ketone solvents and can have mixed therewith aromatic hydrocarbon solvents such as benzene, toluene and xylene. Aromatic hydrocarbon solvents alone can be employed in many cases. Chloroform, carbon tetrachloride and aliphatic hydrocarbons have been employed which dissolve the selected backbone polymer.

The free radical polymerization catalyst is of peroxide type, such as benzoyl peroxide, acetyl peroxide, cumene hydroperoxide, methyl ethyl ketone peroxide, etc. Significant effects have been attained with aliphatic azo compounds such as azobisisobutylnitrile.

The modified or graft polymer differs from a mixture or blend of the backbone polymer with the polymer of the bifunctional component by its greater stability through the chemical bonding: whereas the mixture does not have the chemical bond attachments, and the components can be separated by various means. For example, 10 grams of a graft copolymer of glycidyl methacrylate on a polyvinylidene chloride:polyvinyl chloride (15:85) backbone polymer (intrinsic viscosity .30) was dissolved in methyl ethyl ketone. To this solution was added one cc. of concentrated phosphoric acid. Gelation occurred almost immediately. The gelled material (crosslinked through the oxirane rings) was removed by filtration. The remaining filtrate was then treated with eight volumes of isopropyl alcohol and all the ungelled remaining polymer precipitated. This backbone polymer, polyvinylidene chloride:polyvinyl chloride, after drying, weighed 1.9 grams. Thus approximately 80 percent of the backbone chain is bound chemically to the polyglycidyl methacrylate which is in form of branches.

Similarly, a product was prepared as in Example 1, with epoxidized polybutadiene in place of glycidyl methacrylate. The epoxidized polybutadiene was prepared from polybutadiene, with a molecular weight of 2,600 to 2,800. The graft copolymer showed that over seventy percent of the backbone vinyl halide copolymer had received grafts of the epoxy-containing radicals. The structure of the epoxidized polybutadiene is apparently

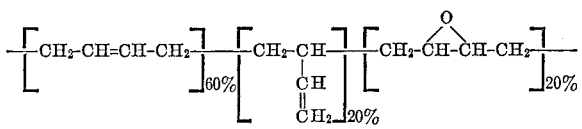

with the grafting occurring through the reactivity of the vinyl groups in such chain molecules; the oxirane rings being present approximately at every third or fourth unit. Therewith, a polymer type of branch is being grafted, in lieu of the conjoint grafting and production of chains from initial monomer as in Example 1. In practice, significant cross-linking was not observed; noting that the solubility was satisfactory, whereas such solubility would be less upon cross-linking. It appears probable that one or both arms of the grafted branch may become connected to other structures of the above type, e.g., corresponding to dimerization at such branches, during the reaction.

When this test was repeated with a blend of the polymers equal in oxirane content to the above material, gelation removed only the polyglycidyl methacrylate. All the backbone copolymer was reclaimed through precipitation, demonstrating that no chemical bonding exists in the blend.

A further distinction of structural difference between the grafted polymer and the blend of polymers was the difference of shear and tensile strength on an Instron tensile tester. The graft polymer showed a tensile strength of 6,500 pounds per inch; while the blend has a strength of 4,700 pounds per inch. Backbone copolymer of vinyl chloride-vinyl acetate shows a shear tensile strength of 7,440 pounds per inch.

A comparison of the vinyl halide polymers, with the grafted polymers of Examples 1, 2 and 3, and with the ungrafted blends, is set out in Table I.

*Table I*

BACKBONE POLYMERS

| Example | Polymer | I.V. | C.T.D. | Soft point, °C. | Shear tensile | Percent epirane oxygen | Flex | Adhesion |
|---|---|---|---|---|---|---|---|---|
| I | 0.53 | 3 min., 360° F | 82 | 7.44×10³ | None | Fair | Poor. |
| III | 0.46 | do | 65 | 1.78×10³ | None | do | Do. |

GRAFTED PRODUCTS

| (1) | I+GM | 0.37 | 15 min., 380°F | 65 | 6.6×10³ | 0.58 | Good | Fair. |
| (2) | I+GM | 0.42 | 20 min., 400°F | 57 | 6.5×10³ | 1.23 | do | Good. |
| (3) | III+GM | 0.30 | do | 55 | 1.93×10³ | 0.83 | do | Do. |

BLENDS

| I+PGM | | | | 67 | 4.6×10³ | 1.23 | Fair | Fair. |
| III+PGM | 0.49 | | | | | 0.83 | do | Do. |

In the above, I.V. denotes intrinsic viscosity at 20 degrees C. in dichloroethane; C.T.D. the condition for complete thermal decomposition on the electrolytic tin plate surface, in minutes of time at stated temperature; Soft. point, the softening point of the material; Shear tensile, the strength in pounds per inch on the Instron tester; Flex., denotes flexibility upon bending the coated sheet and observing fracturing; Adhesion, the maintained attachment to the metal sheet during flexing and upon scratching. Polymer I is the copolymer of vinyl chloride and vinyl acetate at 87:13 ratio. Polymer III is the copolymer of vinylidene chloride and vinyl chloride at 15:85 ratio. GM is glycidyl methacrylate. PGM is polyglycidyl methacrylate.

It is obvious that the invention is not restricted to the illustrative examples and that it can be practiced in other ways within the scope of the appended claims.

What is claimed is:

1. The method of forming vinyl halide copolymers with oxirane-containing side groups which comprises heating an organic solvent solution containing a vinyl halide polymer, an oxirane-containing component selected from the class consisting of glycidyl acrylate, glycidyl methacrylate, glycidyl vinyl ether, butadiene monoxide, and dipentene monoxide, and a free radical polymerization catalyst, at a temperature of 60 to 100 degrees C., thereby effecting bonding of the said component as grafted branches upon the vinyl halide polymer as a backbone, and effecting polymerization of the said component in extension of the grafted branches.

2. The method of producing a vinyl halide copolymer having oxirane-containing side groups, which comprises conjointly effecting bonding of branches to a preformed vinyl halide polymer and polymerization upon said branches, by heating an organic solvent solution containing a vinyl halide polymer, an oxirane-containing component selected from the class consisting of glycidyl acrylate, glycidyl methacrylate, glycidyl vinyl ether, butadiene monoxide, and dipentene monoxide, and a free radical polymerization catalyst, at a temperature of 60 to 100 degrees C. for a time of 8 to 2 hours inversely dependent upon the temperature.

3. The method of preparing a coating upon a metal substrate, which comprises heating, at 60 to 100 degrees C. for a time of 8 to 2 hours inversely dependent upon the temperature, an organic solvent solution containing a vinyl halide polymer, an oxirane-containing component selected from the class consisting of glycidyl acrylate, glycidyl methacrylate, glycidyl vinyl ether, butadiene monoxide, and dipentene monoxide, and a free radical polymerization catalyst and thereby effecting bonding of the said component at side groups on the said polymer, separating the grafted copolymer, dissolving in an organic solvent, applying to the substrate and baking.

4. The method of preparing a vinyl chloride polymer capable of bonding to a metal substrate upon baking, which comprises heating an organic solvent solution containing a vinyl chloride:vinyl acetate copolymer, glycidyl methacrylate monomer, and a free radical polymerization peroxide catalyst, at a temperature of 60 to 100 degrees C. for a time of 8 to 2 hours, with an inert atmosphere, and thereby effecting bonding of the methacrylate to the copolymer and polymerization of the methacrylate, and separating the grafted copolymer from the solution.

5. The method of preparing a vinyl chloride polymer capable of bonding to a metal substrate upon baking, which comprises heating an organic solvent solution containing a vinylidene chloride:vinyl chloride copolymer, glycidyl methacrylate monomer, and a free radical polymerization peroxide catalyst, at a temperature of 60 to 100 degrees C. for a time of 8 to 2 hours, with an inert atmosphere, and thereby effecting bonding of the methacrylate to the copolymer and polymerization of the methacrylate, and separating the grafted copolymer from the solution.

6. The method as in claim 1, in which the oxirane-containing component is a glycidyl acrylate.

7. The method as in claim 1, in which the oxirane-containing component is glycidyl methacrylate.

8. The method as in claim 1, in which the oxirane-containing component is butadiene monoxide.

9. A composition of matter comprising a vinyl halide backbone polymer having thereon grafted side groups containing oxirane rings, said groups being derived from the class consisting of glycidyl acrylate, glycidyl methacrylate, glycidyl vinyl ether, butadiene monoxide, and dipentene monoxide.

10. A composition of matter comprising a vinyl halide backbone polymer having thereon grafted side groups containing oxirane rings, said groups being formed by polymerization of glycidyl methacrylate.

11. The composition of claim 10, in which the vinyl halide backbone polymer is a copolymer of vinyl chloride and vinyl acetate.

12. The composition of claim 10, in which the vinyl halide backbone polymer is a copolymer of vinylidene chloride and vinyl chloride.

13. A composition of matter comprising a vinyl halide backbone polymer having grafted side groups containing oxirane rings, said groups being polymerized butadiene monoxide.

14. A composition of matter comprising a vinyl chloride polymer having thereon grafted side groups containing oxirane rings, said groups being formed by polymerization of glycidyl acrylate.

15. The composition of claim 14, in which the vinyl chloride polymer is a copolymer of vinyl chloride and vinyl acetate.

16. The composition of claim 14, in which the vinyl chloride polymer is a copolymer of vinylidene chloride and vinyl chloride.

References Cited in the file of this patent
UNITED STATES PATENTS

| | | |
|---|---|---|
| 2,255,487 | Feagin | Sept. 9, 1941 |
| 2,470,324 | Staudinger et al. | May 17, 1949 |
| 2,707,177 | Skiff et al. | Apr. 26, 1955 |
| 2,988,524 | Fitch | June 13, 1961 |